United States Patent [19]
Jovan et al.

[11] Patent Number: 5,529,376
[45] Date of Patent: Jun. 25, 1996

[54] VEHICLE SEAT ASSEMBLY

[75] Inventors: Dragi Jovan, Farmington Hills; David A. Bargiel, Troy; Thomas J. Susko, Eastpoint; Steven A. Schulte, Novi, all of Mich.

[73] Assignee: Chrysler Corporation, Auburn Hills, Mich.

[21] Appl. No.: 223,881

[22] Filed: Apr. 6, 1994

[51] Int. Cl.[6] .................................................. A47C 15/00
[52] U.S. Cl. ................... 297/257; 297/248; 297/188.07; 297/463.1
[58] Field of Search ............................. 296/63, 64, 65.1; 280/801.1; 248/429; 297/232, 248, 257, 344.1, 464, 188.04, 188.01, 188.07, 463.1

[56] References Cited

U.S. PATENT DOCUMENTS

| | | | |
|---|---|---|---|
| 808,679 | 1/1906 | Pickles . | |
| 911,246 | 2/1909 | Kilburn . | |
| 2,955,644 | 10/1960 | Kramer | 296/65.1 X |
| 3,193,326 | 7/1965 | Smith | 297/257 |
| 3,727,977 | 4/1973 | Gmeiner | 297/344.1 |
| 4,657,302 | 4/1987 | Snyder | 297/232 |
| 4,759,580 | 7/1988 | Berklich, Jr. et al. | 296/65.1 |
| 5,022,677 | 6/1991 | Barbiero | 280/801.1 |
| 5,322,344 | 6/1994 | Hoffman et al. | 297/188.04 |
| 5,344,188 | 9/1994 | Mims et al. | 280/801.1 X |

FOREIGN PATENT DOCUMENTS

| | | | |
|---|---|---|---|
| 604911 | 9/1960 | Canada | 297/257 |
| 556385 | 7/1923 | France | 297/257 |
| 57-140238 | 8/1982 | Japan | 297/257 |
| 8200618 | 3/1982 | WIPO | 297/257 |

*Primary Examiner*—Milton Nelson, Jr.
*Attorney, Agent, or Firm*—Edward P. Barthel

[57] ABSTRACT

A vehicle modular three-across seat, or, so-called, split bench seat assembly, including two wide outboard seat structures and a narrower middle seat structure. Each outboard seat structure is supported on the floor of the vehicle by four corner anchors for independent forward and aft movement. The middle seat is supported in a fixed manner by four corner support brackets extending outwardly and downwardly to mount on the adjacent two pairs of front and rear corner anchors. The modular three-seat assembly is adapted to be installed as a unit in the vehicle by securing the four corner anchors of each of the two outboard seat structures to the vehicle floor pan.

7 Claims, 6 Drawing Sheets

5,529,376

1

VEHICLE SEAT ASSEMBLY

FIELD OF THE INVENTION

This invention relates generally to vehicle seat assemblies and, more particularly, to a modular three-across seat assembly wherein fewer than normal floor anchors may be efficiently and safely used.

BACKGROUND ART

Heretofore, for a vehicle three-across seat arrangement, four corner anchors have been required for each of the three seat structures. For such seat structure arrangements, installation has generally involved installing the three seat structures individually into the vehicle, i.e., installing the middle seat structure first, followed by installing the two outer seat structures from opposite sides of the vehicle through associated side door frame openings.

DISCLOSURE OF THE INVENTION

A general object of the invention is to provide an improved three-across vehicle seat assembly.

Another object of the invention is to provide an improved modular three-across vehicle seat assembly.

A further object of the invention is to provide a modular three-across vehicle seat assembly wherein the outboard two seat structures are each adapted for support on the floor pan by an associated set of four corner anchors, and wherein the middle seat is supported in a piggyback manner on adjacent fore and aft inboard floor anchors of the two outboard seats, thus requiring a total of eight floor anchors for the middle.

Still another object of the invention is to provide a three-across vehicle seat assembly as set for above which is assembled exterior of the vehicle, loaded into the vehicle through one side door frame opening thereof and mounted to the floor pan by eight anchors to two outboard and one central floor plates.

A still further object of the invention is to provide a modular three-across vehicle seat assembly, including two wide outboard seat structures and a narrower middle seat, wherein each outboard seat structure is adapted for support on four corner anchors for independent adjustable fore and aft movement, and the middle seat is fixedly supported by four corner support brackets extending outwardly and downwardly to mount on the adjacent two pairs of fore and aft floor pan corner anchors.

These and other objects and advantages will become more apparent when reference is made to the following drawings and the accompanying description.

2

Figure 3:
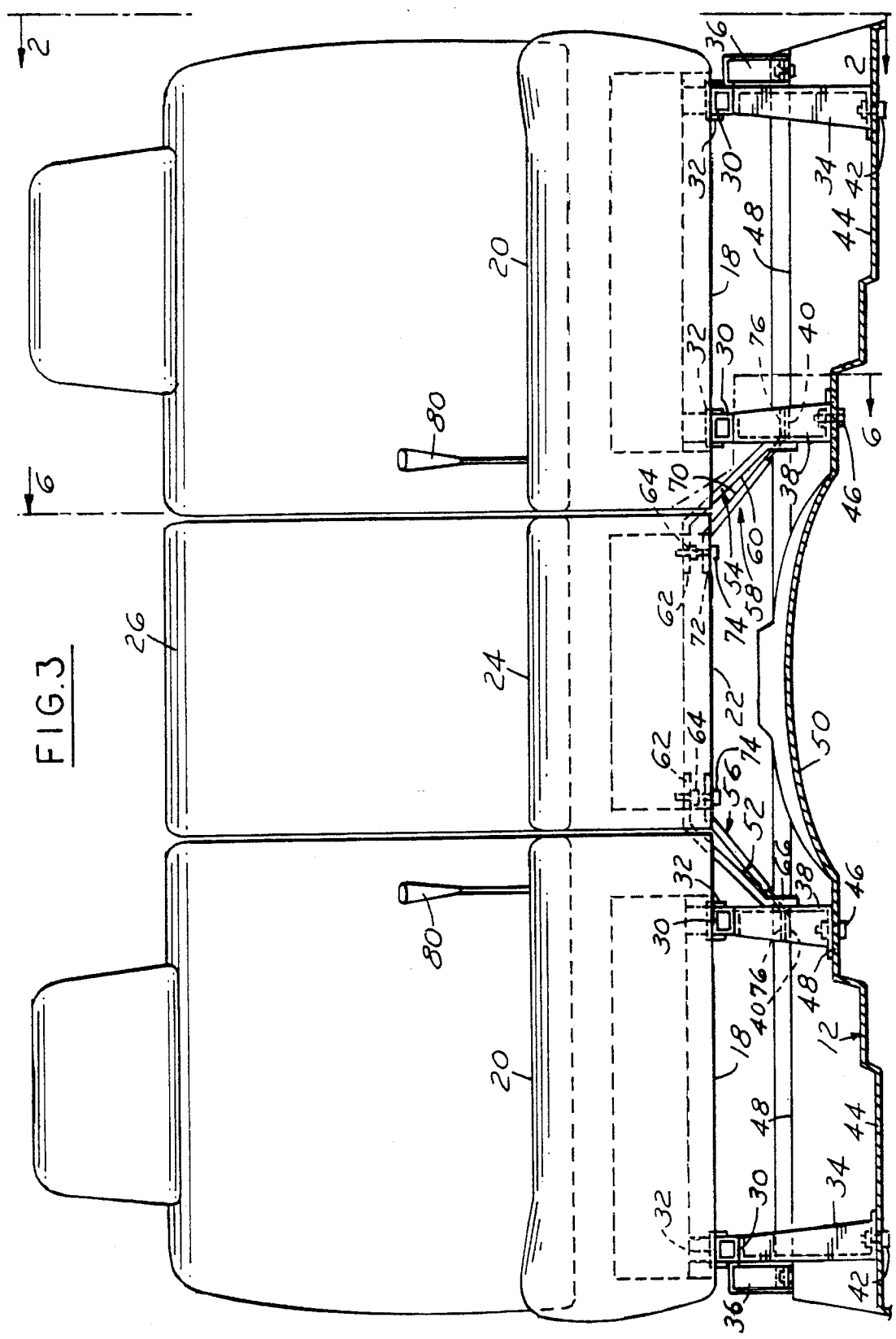
FIG. 3 is a front view of the seat assembly of FIGS. 1 and 2.
Figure 6:
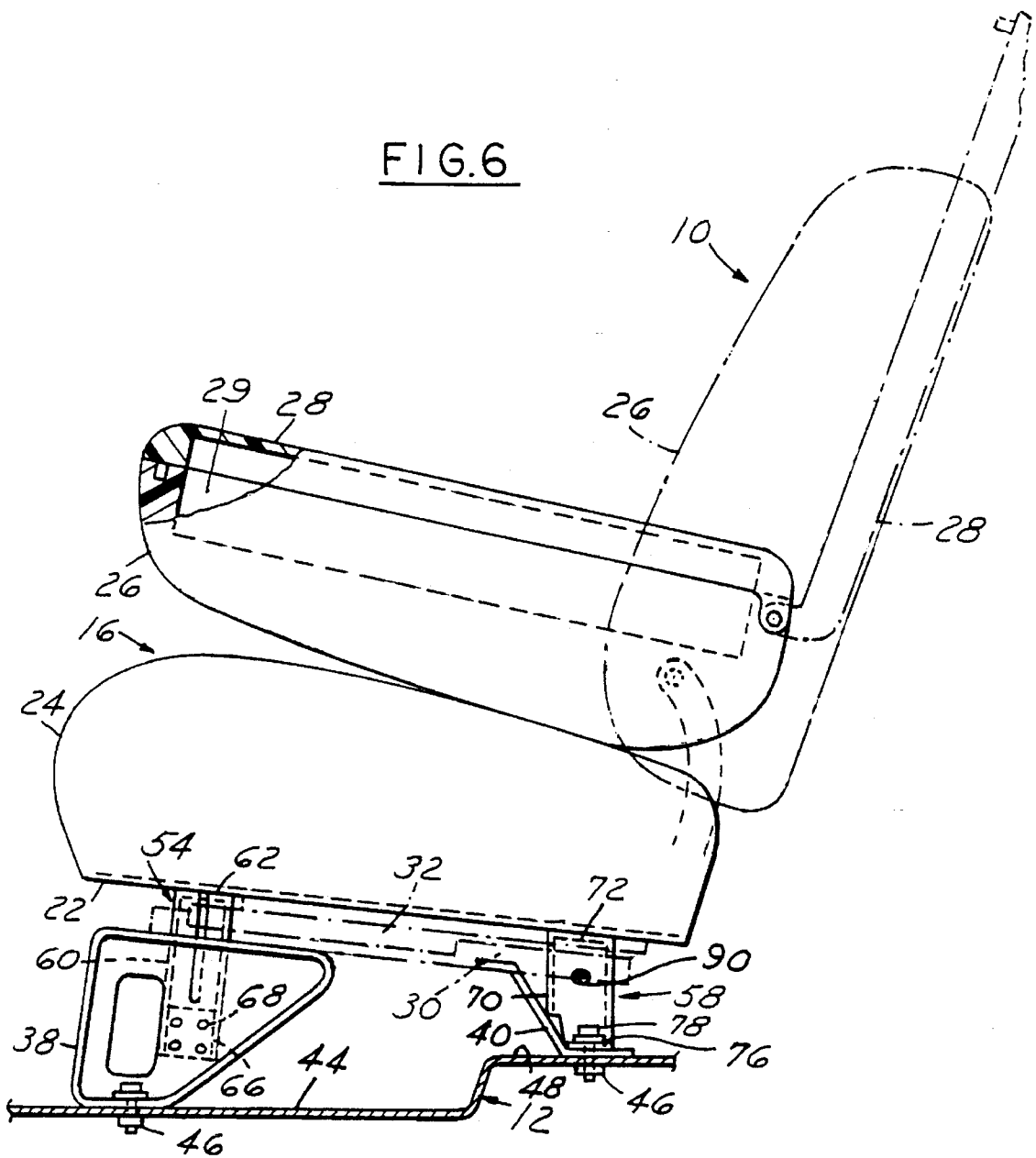

FIG. 6 is a cross-sectional view taken along the plane of the line 6—6 of FIG. 3, and looking in the direction of the arrows.

BEST MODE OF CARRYING OUT THE INVENTION

Figure 1:
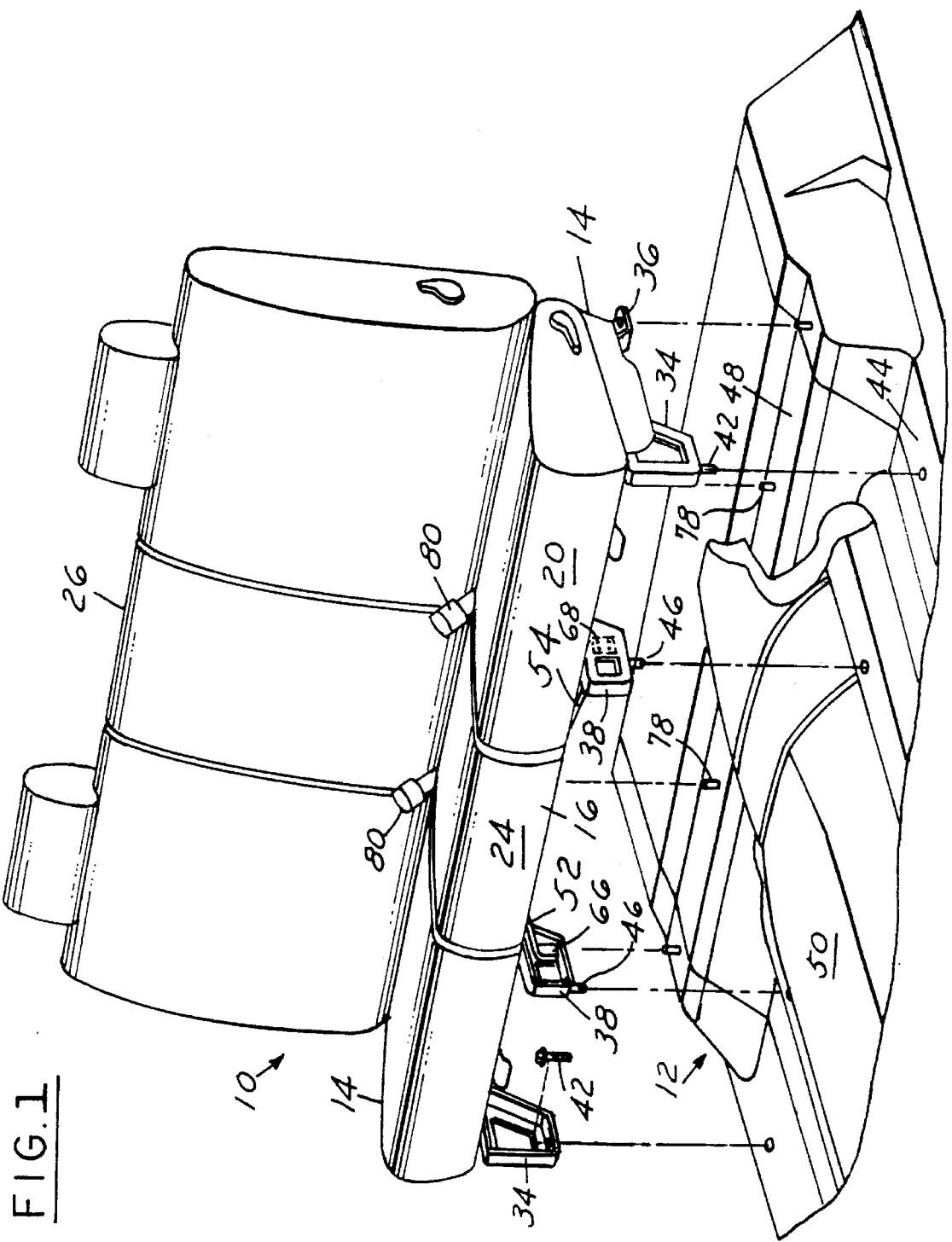
FIG. 1 is a perspective view of a vehicle seat assembly and floor pan embodying the invention.

Referring now to the drawings in greater detail, FIG. 1 illustrates a three-across vehicle seat or split bench seat assembly 10 considered to be particularly suitable for vehicles, such as the Dodge Ram Pickup. The assembly 10 is adapted to being mounted on a floor pan 12 by eight anchors, as will be explained. The seat assembly 10 is one complete unit comprising two wide outboard seat structure segments 14 and a narrow middle seat structure segment 16.

Each outboard segment 14 includes a seat frame 18 and a driver (left hand side) or passenger (right hand side) outboard seat 20. The narrow middle segment 16 comprises a seat frame 22 and a seat cushion portion 24. The latter seat cushion portion 24 includes a seat backrest 26 adapted to fold down about a transverse pivot axis onto the seat cushion 24 to serve as an armrest. In its folded-down position, the armrest/backrest 26 may be opened by lifting a cover 28 about a transverse hinge axis "A" (FIG. 6), exposing compartments, represented as 29, for such items as a personal computer, phone, and tapes.

Figure 2:
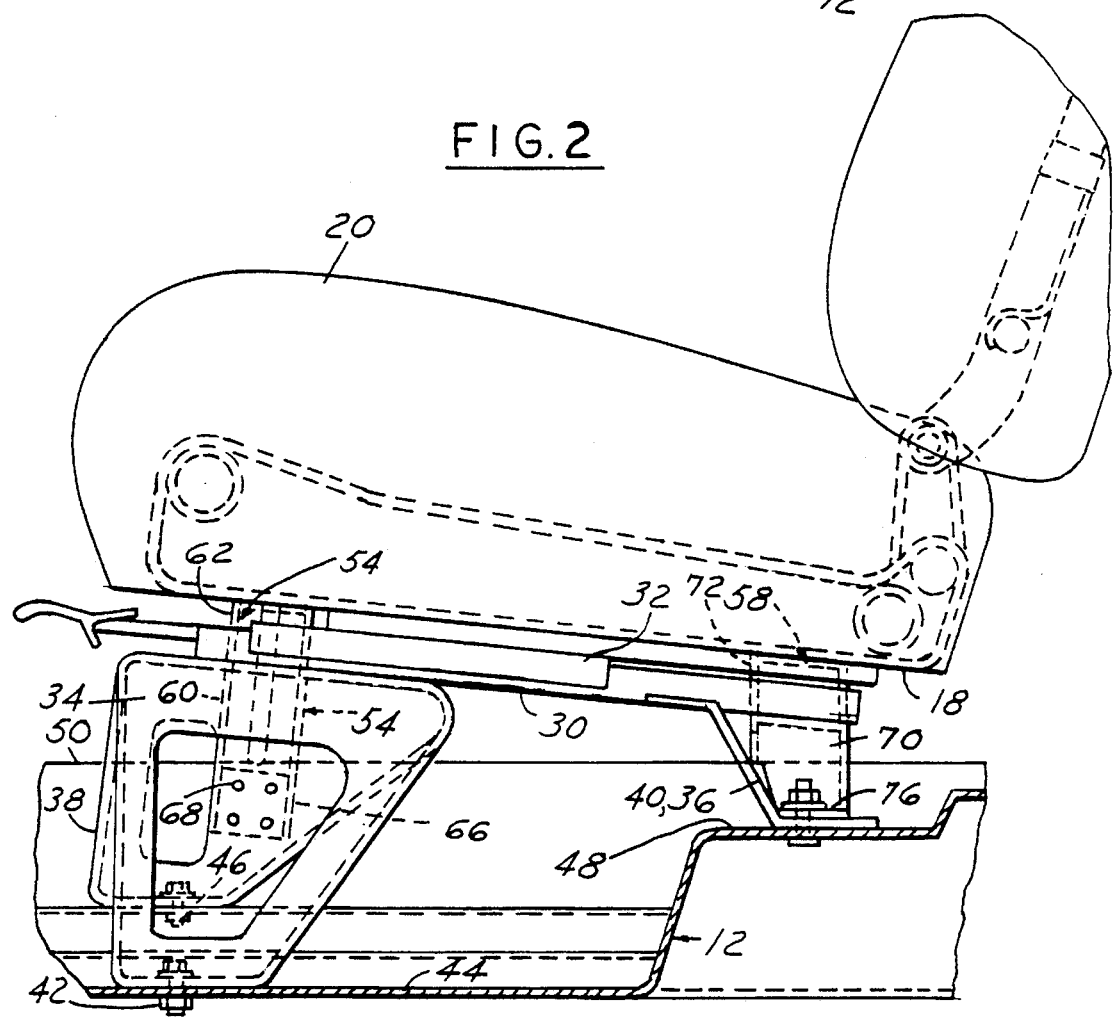
FIG. 2 is a side elevational view of the vehicle seat assembly embodying the invention.

Each frame 18 is slidably mounted on a pair of oppositely disposed fixed longitudinal tracks 30 by a pair of longitudinal slide members 32. Four corner anchors 34, 36, 38, 40 extend downwardly from the respective fore and aft ends of the fixed longitudinal tracks 30. The outboard front corner anchors 34 are each secured by screws 42 to a horizontal section 44 (FIGS. 1–3) of the floor pan 12. The inboard front corner anchors 38 are secured by screws 46 to horizontal sections 47. The four rear anchors 36 and 40 are secured by studs 49 and nuts 51 is oppositely disposed, outwardly extending floor pan flanges 48 (FIG. 1) adjacent a longitudinally extending, inverted U-shaped portion 50 of the floor pan 12. The latter portion 50 is mounted over the vehicle's drive train.

Figure 5:
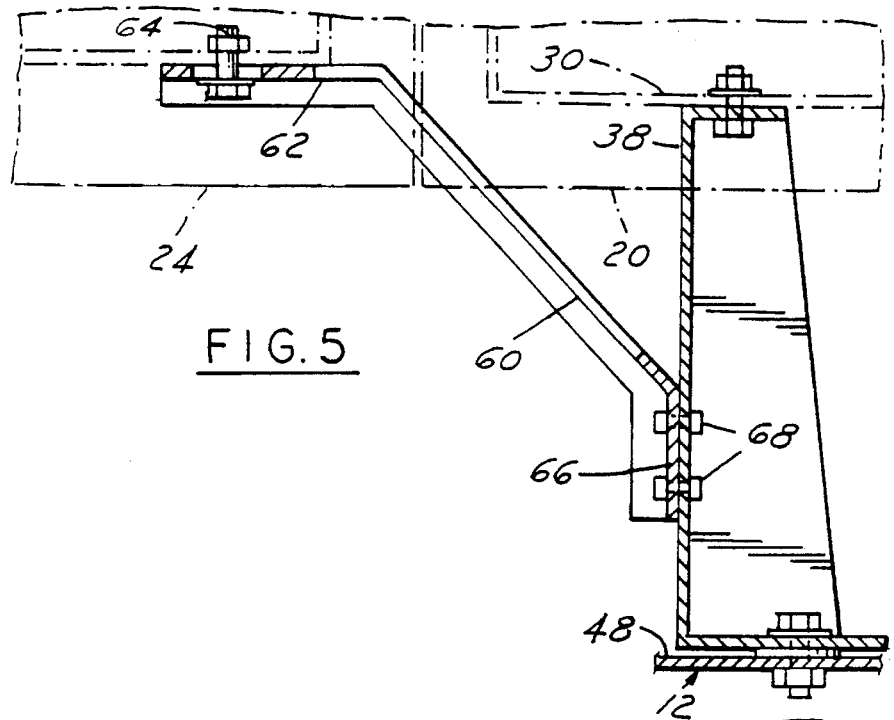
FIG. 5 is an enlarged cross-sectional view of one of two front support brackets embodied in the invention and taken along the plane of the line 5—5 of FIG. 4, and looking in the direction of the arrows.
Figure 4:
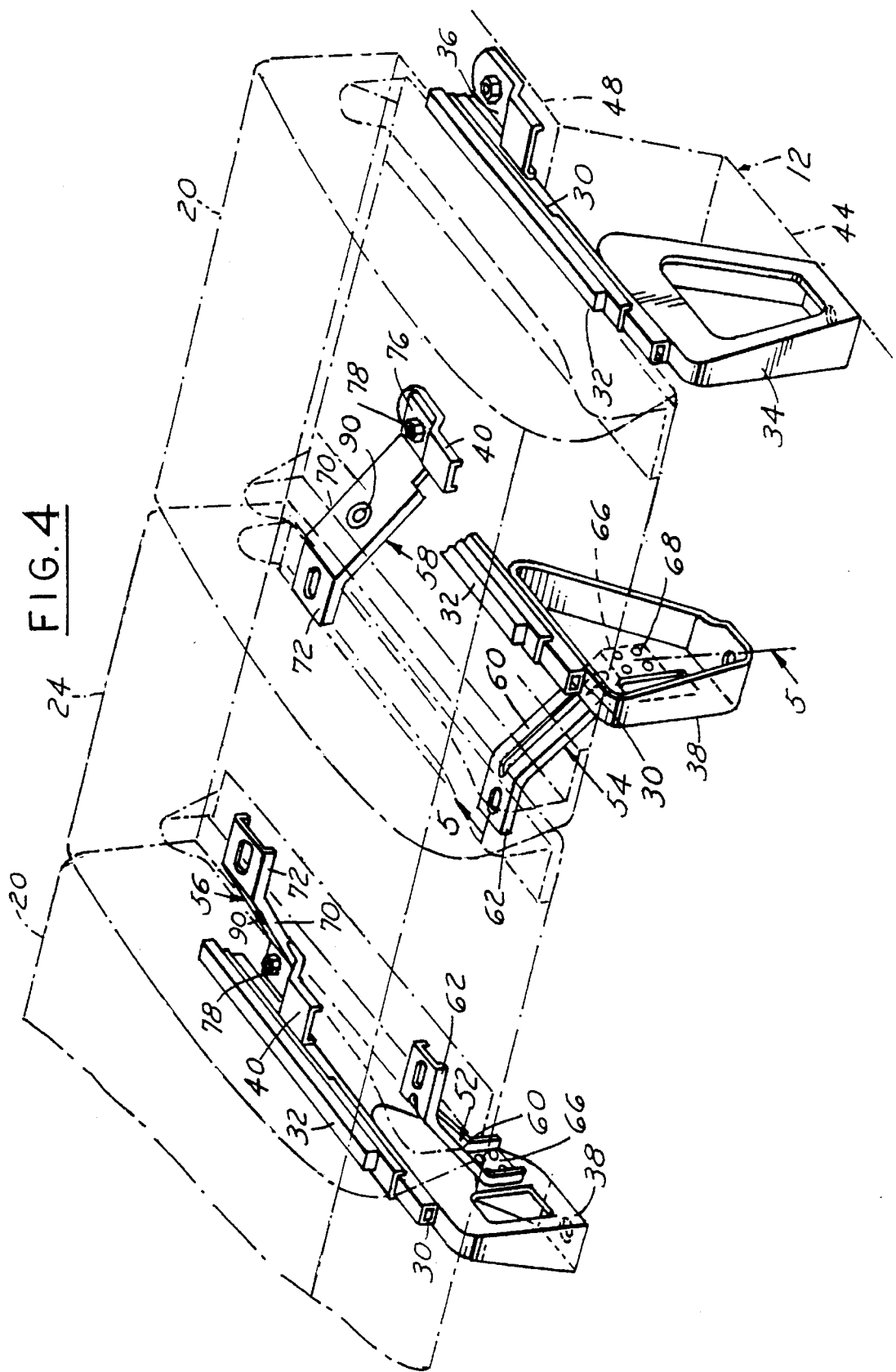
FIG. 4 is a perspective view illustrating the floor anchors, and associated support brackets of the invention.

The middle seat frame 22 has two front corner support brackets 52 and 54, and two aft corner support brackets 56 and 58. As shown in FIGS. 4 and 5, each front bracket 52 and 54 is formed to include a brace segment 60 angled outwardly and downwardly at a predetermined angle of the order of forty five degrees, a horizontal mounting flange 62 at the upper end thereof secured by a bolt 64 (FIGS. 3 and 5) to the front of the frame 22, and a vertical mounting flange 66 at the lower end thereof secured by a rivets 68 to a side of the adjacent corner anchor 38 extending from the frame 18.

As shown in FIG. 4, each aft support bracket 56 and 58 is also formed to include a brace segment 70 angled outwardly and downwardly at a predetermined angle, a horizontal mounting flange 72 at the upper end thereof secured by a bolt 74 (Figure 3) to the rear of the middle seat frame 22, and a second horizontal mounting flange 76 at the lower end thereof secured by the nut 51 and the associated stud 49 (FIG. 1) to the anchor 40.

It will be noted that a pair of sub-assemblies are provided for the three-across seat assembly 10 by virtue of each aft bracket 56 and 58 being welded to its associated anchor 40 prior to being attached to the middle seat structure frame 22.

Figure 7:
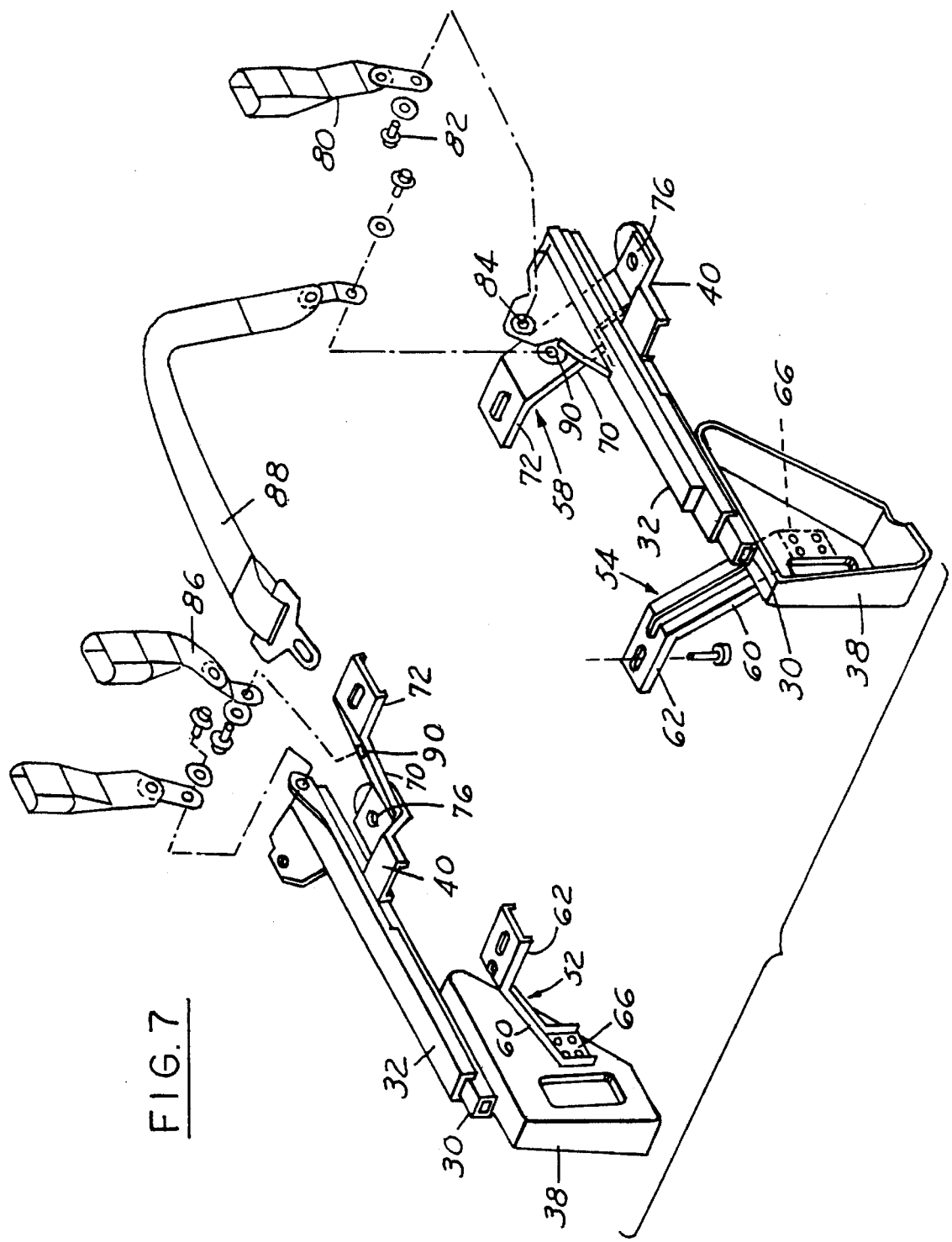

As shown in FIG. 7, an occupant restraint belt connector 80 is mounted by fasteners 82 on a bracket 84 on a side of the rear corner of each longitudinal slide member 32, so as to be movable therewith. A seat belt bracket 86 and cooperating belt and tongue 88 for the middle seat segment 16 are attached by fasteners 90 through openings 92 (FIG. 4) to the center portions of the rear corner support brackets 56 and 58. Thus, the two conventional seat belt floor anchors are eliminated.

Constructed in the above described manner, for installation into the vehicle, the modular three-across seat assembly 10 is adapted for mounting as a unit. In one form the unit may be transported to the vehicle assembly line and inserted laterally by an automatic seat loader (not shown) through the driver's side door opening, and then secured to the respective floor pan segment 44 and U-shaped portion 50.

A conventional seat assembly, consisting of two wide outboard seat structures, i.e., the driver's and passenger's seat structures, and a narrower independent middle seat structure, are installed by first mounting the center independent seat by four floor anchors, and then mounting the two outboard seat structures from opposite sides of the vehicle, and securing each seat structure by four floor anchors, for a total of twelve anchors. As such, this is a time consuming method with a consequent cost and weight penalty.

Industrial Applicability

It should be apparent that a vehicle equipped with the eight seat anchor arrangement is adaptable to having a standard bench type seat assembly mounted therein.

While but one embodiment of the invention is shown and described, other modifications thereof are possible within the scope of the following claims.

What is claimed is:

1. In a vehicle modular three-across seat assembly including two wide outboard seat structures and a narrower middle seat structure, wherein each outboard seat structure comprises a seat frame having oppositely disposed longitudinal slide members slidably mounted on respective tracks, with a floor anchor secured to each forward and each rear end portion of each track, and the middle seat structure comprising a seat frame, the improvement comprising two front and two aft support brackets secured between the respective four corner portions of the middle seat frame and the respective two front and two rear adjacent floor anchors of the two outboard seat structures, wherein each said outboard seat structure being adapted for independent fore and aft adjustable movement relative to said middle seat structure.

2. The vehicle modular three-across seat assembly described in claim 1, wherein the narrower middle seat structure includes a back which is adapted to be pivoted downwardly, and includes a back cover which is pivotable upwardly to expose at least one storage compartment therein.

3. In a vehicle modular three-across seat assembly including two wide outboard seat structures and a narrower middle seat structure, wherein each outboard seat structure comprises a seat frame having oppositely disposed longitudinal slide members slidably mounted on respective tracks, with a floor anchor secured to each forward and each rear end portion of each track, and the middle seat structure comprising a seat frame, the improvement comprising two front and two aft support brackets secured between the respective four corner portions of the middle seat frame and the respective two front and two rear adjacent floor anchors of the two outboard seat structures, wherein each front support bracket is formed to include a brace segment angled outwardly and downwardly at a predetermined angle, a substantially horizontal mounting flange secured to said middle seat frame, and a substantially vertical mounting flange secured to the adjacent respective floor anchor.

4. In a vehicle modular three-across seat assembly including two wide outboard seat structures and a narrower middle seat structure, wherein each outboard seat structure comprises a seat frame having oppositely disposed longitudinal slide members slidably mounted on respective tracks, with a floor anchor secured to each forward and each rear end portion of each track, and the middle seat structure comprising a seat frame, the improvement comprising two front and two aft support brackets secured between the respective four corner portions of the middle seat frame and the respective two front and two rear adjacent floor anchors of the two outboard seat structures, wherein each rear support bracket is formed to include a brace segment angled outwardly and downwardly at a predetermined angle, a substantially horizontal mounting flange secured to said middle seat frame and a substantially horizontal mounting flange secured to the adjacent respective floor anchor.

5. In a vehicle modular three-across seat assembly including two wide outboard seat structures and a narrower middle seat structure, wherein each outboard seat structure comprises a seat frame having oppositely disposed longitudinal slide members slidably mounted on respective tracks, with a floor anchor secured to each forward and each rear end portion of each track, and the middle seat structure comprising a seat frame, the improvement comprising two front and two aft support brackets secured between the respective four corner portions of the middle seat frame and the respective two front and two rear adjacent floor anchors of the two outboard seat structures, and a seat belt connector secured to an inner rear side portion of each outer seat frame and a center seat belt and buckle respectively secured to said two rear support brackets.

6. In a vehicle modular three-across seat assembly including two wide outboard seat structures and a narrower middle seat structure, wherein each outboard seat structure comprises a seat frame having oppositely disposed longitudinal slide members slidably mounted on respective tracks, with a floor anchor secured to each forward and each rear end portion of each track, and the middle seat structure comprising a seat frame, the improvement comprising two front and two aft support brackets secured between the respective four corner portions of the middle seat frame and the respective two front and two rear adjacent floor anchors of the two outboard seat structures, and a center seat belt and buckle respectively secured to said two rear support brackets.

7. In a vehicle modular three-across seat assembly including two wide outboard seat structures and a narrower middle seat structure, wherein each outboard seat structure comprises a seat frame having oppositely disposed longitudinal slide members slidably mounted on respective tracks, with a floor anchor secured to each forward and each rear end portion of each track, and the middle seat structure comprising a seat frame, the improvement comprising two front and two aft support brackets secured between the respective four corner portions of the middle seat frame and the respective two front and two rear adjacent floor anchors of the two outboard seat structures, and a contoured floor pan adapted to having the total of four forward and four rear floor anchors secured thereto to support the three seat frames.

\* \* \* \* \*